(12) United States Patent
Hasegawa et al.

(10) Patent No.: US 11,436,614 B2
(45) Date of Patent: Sep. 6, 2022

(54) SERVER DEVICE AND TRACEABILITY METHOD

(71) Applicant: Hitachi, Ltd., Tokyo (JP)

(72) Inventors: Manabu Hasegawa, Tokyo (JP); Naoki Furuya, Tokyo (JP); Tadayoshi Kosaka, Tokyo (JP); Yusuke Jin, Tokyo (JP)

(73) Assignee: HITACHI, LTD., Tokyo (JP)

( * ) Notice: Subject to any disclaimer, the term of this patent is extended or adjusted under 35 U.S.C. 154(b) by 135 days.

(21) Appl. No.: 16/927,071

(22) Filed: Jul. 13, 2020

(65) Prior Publication Data

US 2021/0090091 A1 Mar. 25, 2021

(30) Foreign Application Priority Data

Sep. 25, 2019 (JP) .............................. JP2019-174313

(51) Int. Cl.
| | |
|---|---|
| *G06Q 30/00* | (2012.01) |
| *G06F 16/23* | (2019.01) |
| *G06F 16/27* | (2019.01) |
| *G06F 16/13* | (2019.01) |
| *G06Q 10/08* | (2012.01) |
| *G06K 7/14* | (2006.01) |
| *G06Q 50/04* | (2012.01) |

(52) U.S. Cl.
CPC ....... *G06Q 30/0185* (2013.01); *G06F 16/137* (2019.01); *G06F 16/2379* (2019.01); *G06F 16/27* (2019.01); *G06K 7/1413* (2013.01); *G06K 7/1417* (2013.01); *G06Q 10/087* (2013.01); *G06Q 50/04* (2013.01); *G06Q 30/014* (2013.01)

(58) Field of Classification Search
CPC .......................... G06Q 30/0185; H04L 9/0643
See application file for complete search history.

(56) References Cited

U.S. PATENT DOCUMENTS

2019/0334730 A1* 10/2019 Endress ................ H04L 9/0866

FOREIGN PATENT DOCUMENTS

JP 2018-169798 A 11/2018

* cited by examiner

*Primary Examiner* — A. Hunter Wilder
(74) *Attorney, Agent, or Firm* — Mattingly & Malur, PC

(57) ABSTRACT

A server device stores data sent from a client device together with data identification information and stakeholder identification information that identifies a stakeholder operating the client device. A controller determines a number of stakeholders included in the data, and, in a case where the data stores information on stakeholders of a plurality of n organizations, leaves information on a specific stakeholder unrewritten and rewrites information of other stakeholders with optional information to generate n types of management data. The controller generates first hash value for each of the n types of management data, and controls n transactions including the first hash value to be issued to a blockchain, and transmits the transaction. The controller returns, in response to a browsing request specifying the data identification information and the stakeholder identification information from the client device, management data corresponding to the stakeholder identification information among the n types of management data.

6 Claims, 15 Drawing Sheets

FIG. 6

```
<AggregationEvent>
  <eventTime>2019/6/24 10:20</eventTime>
  <epcList>
    <parentID>PACKAGE BOX 007</parentID>
    <childEPCs>
      <epc>ZZ WINERY—RED WINE-001</epc>
      <epc>ZZ WINERY—RED WINE-002</epc>
      <epc>ZZ WINERY—RED WINE-003</epc>
      <epc>ZZ WINERY—RED WINE-004</epc>
      <epc>ZZ WINERY—RED WINE-005</epc>
      <epc>ZZ WINERY—RED WINE-006</epc>
    </childEPCs>
  </epcList>
  <action>ADD</action>
  <bizStep>Packing</bizStep>
  <readPoint>
    <id>WW LOGISTICS CENTER</id>
  </readPoint>
</AggregationEvent>
```

```
<AggregationEvent>
  <eventTime>2019/6/24  10:30</eventTime>
  <epcList>
    <parentID>PACKAGE BOX 007</parentID>
    <childEPCs>
     <epc> ZZ WINERY — RED WINE-011</epc>
     <epc> ZZ WINERY — RED WINE-012</epc>
     <epc> ZZ WINERY — RED WINE-013</epc>
     <epc> YY BREWER — SAKE-011</epc>
     <epc> YY BREWER — SAKE-012</epc>
     <epc> YY BREWER — SAKE-013</epc>
    </childEPCs>
  </epcList>
  <action>ADD</action>
  <bizStep>Packing</bizStep>
  <readPoint>
    <id>WW LOGISTICS CENTER</id>
  </readPoint>
</AggregationEvent>
```

```
<AggregationEvent>
  <eventTime>2019/6/24  10:30</eventTime>
  <epcList>
    <parentID>PACKAGE BOX 007</parentID>
    <childEPCs>
     <epc> ZZ WINERY — RED WINE-011</epc>
     <epc> ZZ WINERY — RED WINE-012</epc>
     <epc> ZZ WINERY — RED WINE-013</epc>
     <epc>XXX</epc>
     <epc>XXX</epc>
     <epc>XXX</epc>
    </childEPCs>
  </epcList>
  <action>ADD</action>
  <bizStep>Packing</bizStep>
  <readPoint>
    <id>WW LOGISTICS CENTER</id>
  </readPoint>
</AggregationEvent>
```

```
<AggregationEvent>
  <eventTime>2019/6/24  10:30</eventTime>
  <epcList>
    <parentID>PACKAGE BOX 007</parentID>
    <childEPCs>
     <epc>XXX</epc>
     <epc>XXX</epc>
     <epc>XXX</epc>
     <epc> YY BREWER—SAKE-011</epc>
     <epc> YY BREWER—SAKE-012</epc>
     <epc> YY BREWER—SAKE-013</epc>
    </childEPCs>
  </epcList>
  <action>ADD</action>
  <bizStep>Packing</bizStep>
  <readPoint>
    <id>WW LOGISTICS CENTER</id>
  </readPoint>
</AggregationEvent>
```

| TxID | FILE NAME | HASH |
|---|---|---|
| 0xc5291379017919ba818be1fd544e030a9470b3fd0a5be60cf2f61ff1c98d625f | 20190624-001-WW LOGISTICS CENTER.xml | ca978112ca1bbdcafac231b39a23dc4da786eff8147c4e72b9807785afee48bb |
| 0x0f7faec86e9ad390f3560c97e3bf6dc2c824f58c55e3270d7855578dac6c0bcb | 20190624-002-1-WW LOGISTICS CENTER.xml | da3811154d59c4267077ddd8bb768fa9b06399c486e1fc00485116b57c9872f5 |
| 0x305e5aa6e0635b67552f4fdbd1eb3edd400c7c3bce97d370d9fb9cbc27ac8984 | 20190624-002-2-WW LOGISTICS CENTER.xml | fc41c44213e3e4ee5cde2e8dcf93a27bec7bb97276b36441f0420cc3a7563460 |
| | | |
| | | |

1001: TxID
1002: FILE NAME
1003: HASH

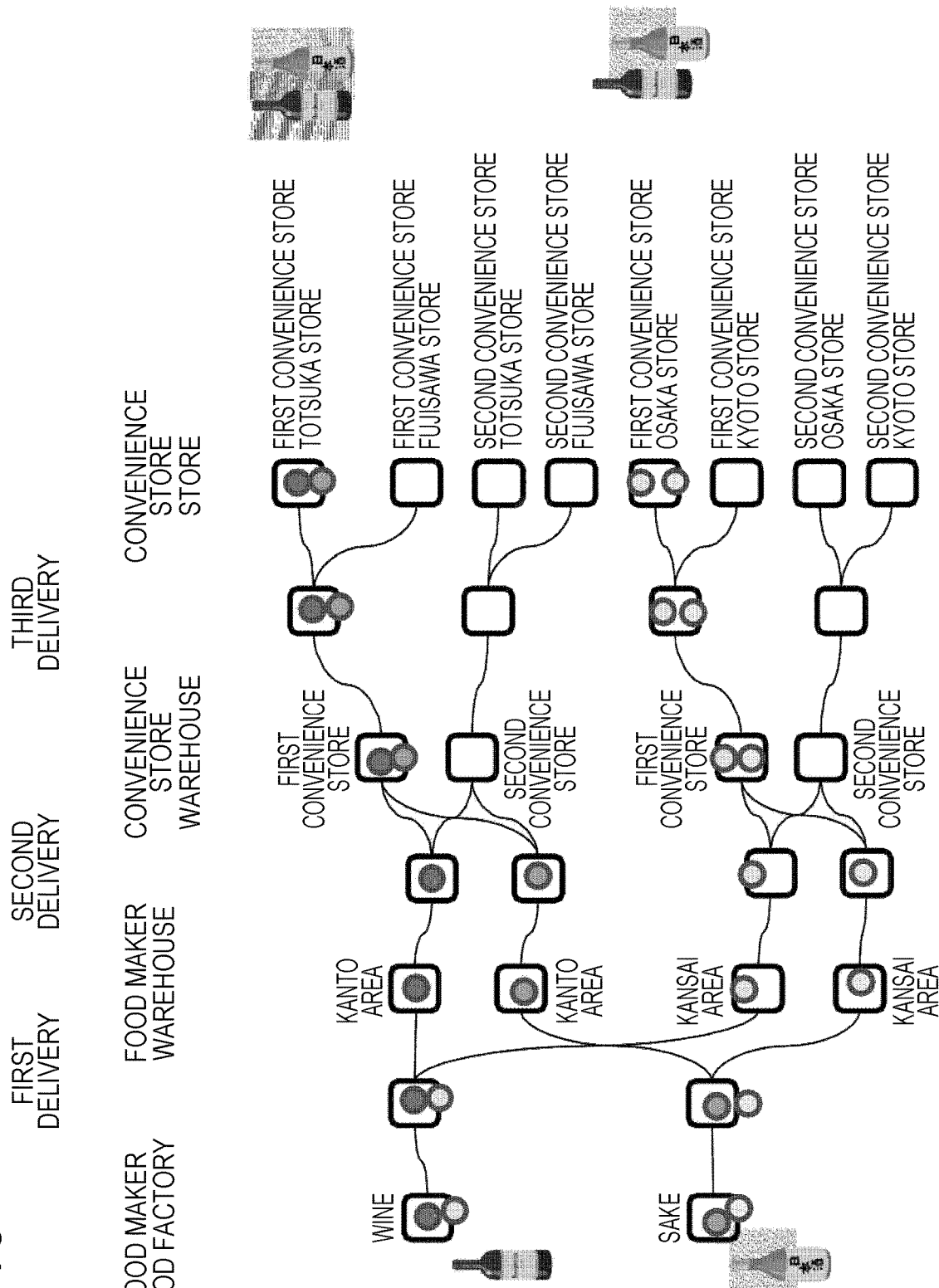

SERVER DEVICE AND TRACEABILITY METHOD

CROSS-REFERENCE TO RELATED APPLICATION

The present application claims priority from Japanese application JP 2019-174313, filed on Sep. 25, 2019, the contents of which is hereby incorporated by reference into this application.

BACKGROUND OF THE INVENTION

1. Field of the Invention

The present invention relates to a technique for proving non-tampering of data collected by a company or the like.

2. Description of the Related Art

In recent years, a management standard for personal information collected by a company has become strict, and reliable protection of data has been requested. A blockchain, by which data tampering can be easily detected, attracts attention also as a data management solution.

As is well known, in a blockchain, data is stored in such a manner that units of data called blocks are generated and connected like a chain. Each block has a hash value of a previous block. Content of a block is proved by a hash value of the block being written in a block immediately after. In order to tamper with a block once registered in a chain, all hash operations of subsequent blocks need to be performed again. Therefore, tampering is considered not possible in reality.

As a technique related to a blockchain, JP 2018-169798 A discloses a system that prevents tampering by recording a hash of a database in a blockchain. According to JP 2018-169798 A, when part or all of a database is rewritten, a hash is changed. Therefore, by comparing a hash of the database with a hash recorded in a blockchain, tampering is confirmed not to be performed. Further, J P 2018-169798 A discloses a technique of recording a root hash, which is a collection of a plurality of hashes, in a blockchain.

SUMMARY OF THE INVENTION

In JP 2018-169798 A, in order to verify that tampering is not performed, all original data of a hash recorded in a blockchain needs to be browsed. Therefore, in a case where the original data includes information of a plurality of stakeholders, information of other stakeholders needs to be browsed, and data sovereignty cannot be guaranteed.

In view of the above, an object of the present invention to provide a server device that can perform data management while ensuring both tamper resistance guarantee and data sovereignty guarantee and a traceability method.

According to a preferred aspect of the present invention, there is provided a server device that includes a storage device for storing data sent from a client device together with data identification information that identifies the data and stakeholder identification information that identifies a stakeholder operating the client device, a control unit that determines number of stakeholders included in the data, and, in a case where the data stores information on stakeholders of a plurality of n organizations, leaves information on a specific stakeholder unrewritten and rewrites information of other stakeholders with optional information to generate n types of management data, generate a first hash value for each of the n types of management data, and control n transactions including the first hash value to be issued to a blockchain, and a communication unit for transmitting the transaction. The control unit returns, in response to a browsing request specifying the data identification information and the stakeholder identification information from the client device, management data corresponding to the stakeholder identification information among the n types of management data.

According to a preferred aspect of the present invention, there is provided a traceability method by a system having a plurality of client devices, a server device, and a blockchain. The client device transmits a file including a manufacturer of a product and a product name to the server device together with a first file name, the server device stores the file from the client device together with the first file name, determines number of manufacturers of a product included in the file, and, in a case where the file describes information on manufacturers of a plurality of products, leaves information on a manufacturer of a specific product unrewritten and rewrites information of manufacturers of other products with optional information to generate n types of management data, and generates a seventh hash value for each of the n types of management data and issues a transaction including the n types of management data, the seventh hash value, and a second file name including manufacturer identification information identifying a manufacturer of the product to the blockchain, the blockchain stores the second file name and the seventh hash value in a manner associating them with each other, the server device returns one pieces of management data among the n types of management data in response to a browsing request specifying the first file name and the manufacturer identification information from one of the plurality of client devices, the blockchain returns an eighth hash value corresponding to the first file name and the manufacturer identification information from the seventh hash value in response to a hash value request including the first file name and the manufacturer identification information from one of the plurality of client devices, and the client device that makes the hash value request generates a ninth hash value relating to the management data from the server device, and compares the generated ninth hash value with the eighth hash value from the blockchain to verify data.

Data management that ensures both tamper resistance guarantee and data sovereignty guarantee can be provided.

BRIEF DESCRIPTION OF THE DRAWINGS

FIG. 6 is a diagram showing an example of data of the packing event (in a case where the number of stakeholders is one);

FIG. 7 is a diagram showing an example of data of the packing event (in a case where the number of stakeholders is two);

FIG. 8 is a diagram showing an example of verification data of a first stakeholder;

FIG. 9 is a diagram showing an example of verification data of a second stakeholder;

FIG. 10 is a diagram showing an example of a data structure of a blockchain;

FIG. 15 is a diagram showing an example of application to a product traceability method of a fourth embodiment.

DESCRIPTION OF THE PREFERRED EMBODIMENTS

Figure 1:
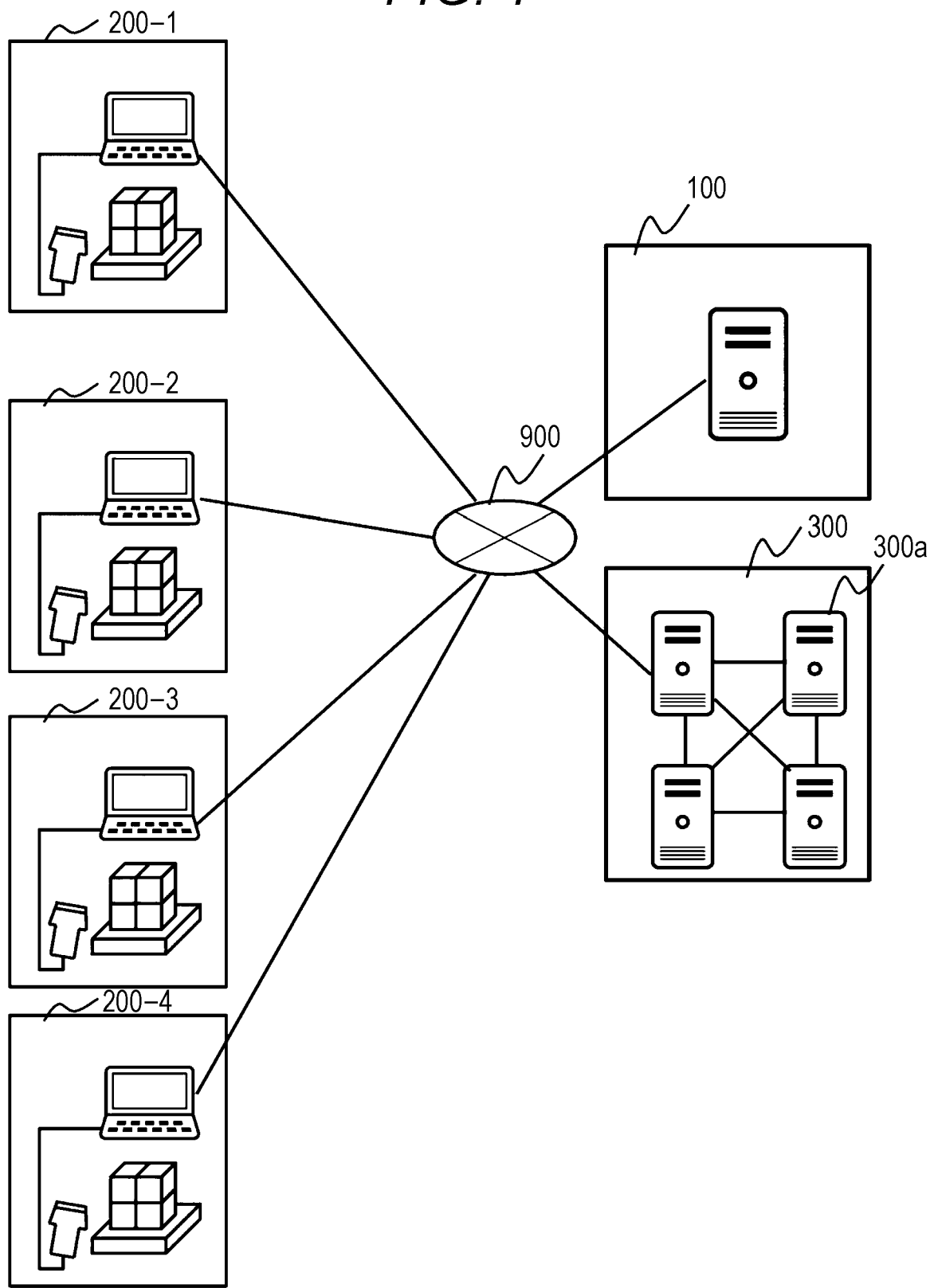
FIG. 1 is an explanatory diagram showing a configuration example of a system according to an embodiment.

Embodiments will be described in detail with reference to the drawings. However, the present invention should not be construed as being limited to the description of the embodiments below. As easily understood by those skilled in the art, a specific configuration of the present invention can be changed without departing from the idea or the spirit of the present invention.

In a configuration of the invention described below, the same reference numerals are commonly used in different drawings for the same portions or portions having similar functions, and redundant description may be omitted.

In a case where there are a plurality of elements having the same or similar functions, description may be made by attaching different subscripts to the same reference numerals. However, in a case where a plurality of elements do not need to be distinguished from each other, the description may be made by omitting a subscript.

The notations such as "first", "second", and "third" in the present description and the like are added to identify constituents, and do not necessarily limit the number, order, or content of the constituents. Further, a number for identifying a constituent is used for each context, and a number used in one context does not always indicate the same configuration in other contexts. Further, a constituent identified by a certain number is allowed to also have a function of a constituent identified by another number.

There is a case where a position, size, shape, range, and the like of each constituent shown in the drawings and the like do not represent an actual position, size, shape, range, and the like, in order to facilitate understanding of the invention. For this reason, the present invention is not necessarily limited to a position, size, shape, range, and the like disclosed in the drawings and the like.

A publication, a patent, and a patent application cited in the present description constitute part of the present description.

A constituent shown in a singular form includes a plural form unless otherwise specifically clarified.

In one of embodiments described in detail below, a server device changes a number Tx according to the number of stakeholders included in data. In the embodiment, Tx means a transaction and corresponds to operation of transferring information including a hash value from the server device to a blockchain. In a case where the number of stakeholders is one, Tx is issued once after data is hashed. If the number of stakeholders is n, Tx is issued n times. In processing of a first time, data in which information of those other than a first stakeholder is replaced with dummy information or deleted is hashed, and Tx is issued including the hash. The above similarly applies to a second and subsequent times, and in processing of an n-th time, data in which information of those other than an n-th stakeholder is replaced with dummy information or deleted is hashed, and Tx is issued including the hash.

The server device records data transmitted from one or a plurality of client devices in a storage device. The server device transmits Tx including a hash value of data to a blockchain. In the blockchain, identification information of the data such as a data name and a hash value are stored corresponding to Tx. In the client device, at the time of data verification, a data name is designated so that data is read from a recording device of the server device, and a hash value of the read data is calculated and, at the same time, compared with a hash value acquired from a blockchain by designating a data name or Tx, so that non-tampering of data is guaranteed.

First Embodiment (Overall System Configuration)

FIG. 1 is an explanatory diagram showing a configuration example of a system to which a first embodiment is applied. This system includes a server device 100, a client device 200, a blockchain 300, and a network 900. The server device 100, the client device 200, and each node 300a that constitutes the blockchain 300 are configured by an ordinary computer system. The computer system includes an input device, an output device, a CPU constituting a processing unit, a memory that is composed of a DRAM, an SRAM, and the like, and stores data and a program, a storage device that is composed of a nonvolatile memory such as an HDD, an SSD, and the like and is for constituting data and a program, an interface for inputting and outputting information to/from the outside, and a bus for connecting a CPU, a memory, a storage device, and an interface.

Figure 2:
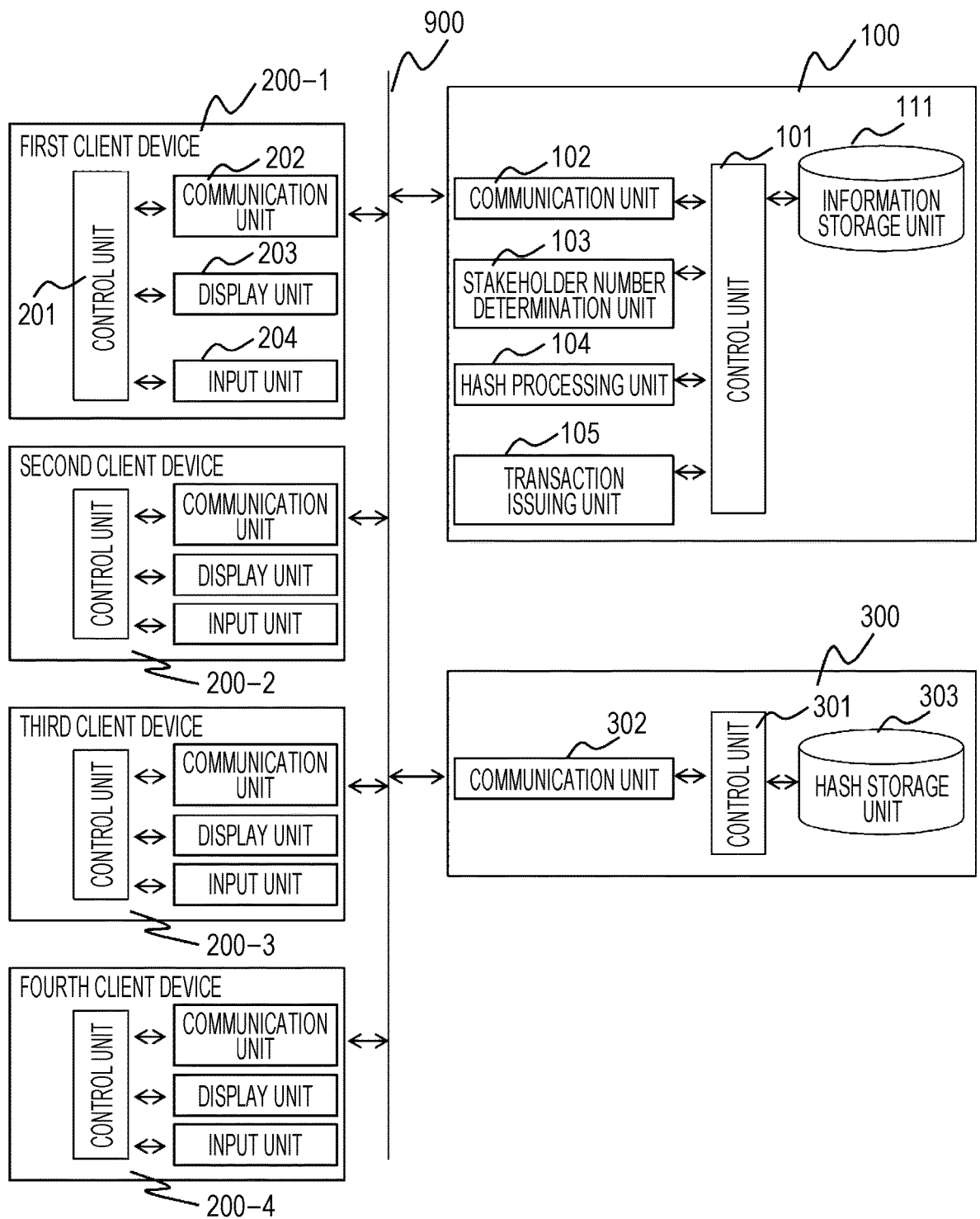
FIG. 2 is a functional block diagram of the system of the embodiment.

FIG. 2 is a functional block diagram showing an entire image of the system to which the first embodiment is applied. This system includes a server device 100, a client device 200, a blockchain 300, and a network 900.

For example, the server device 100 is operated by a data management company that manages data and guarantees non-tampering of data. For example, the client device 200 is operated by a manufacturer, a logistics company, a retailer, or the like who provides data and entrusts management to a data management company or the like. In the first embodiment, the blockchain 300 may be either a public blockchain or a consortium blockchain.

The server device 100, the client device 200, and the blockchain 300 can communicate with each other via the network 900 in a wired or wireless manner, and can exchange data.

The server device 100 is assumed to be a relatively large database server that stores and manages collected data. The server device 100 includes a control unit 101, a communication unit 102, a stakeholder number determination unit 103, a hash processing unit 104, and a transaction issuing unit 105 as processing functions. Further, the server device 100 includes an information storage unit 111 as a database.

The control unit 101 manages the entire device and manages recording of data in a database. The communication unit 102 transmits a transaction to the blockchain 300 via the network 900 and receives a response. The stakeholder number determination unit 103 determines the number of stakeholders of data acquired from the information storage unit 111. Note that, in a case of a product recall use case, a manufacturer is assumed as a stakeholder. The hash processing unit 104 generates a hash of data acquired from the information storage unit 111 (management data from the stakeholder number determination unit). The transaction issuing unit 105 issues a transaction including a hash to the blockchain 300.

The client device 200 is assumed to be a personal computer for exchanging data with the server device 100 and a handy terminal for inputting data. FIG. 2 shows a control unit 201 that receives input from a user and controls the device, a communication unit 202 that performs communication via the network 900, a display unit 203 that displays information to the user, and an input unit 204 that reads information on a product and packing.

In a case where a product recall is assumed as a use case, the input unit 204 reads a barcode and QR code (registered trademark) attached to a product, and one XML file is created as data to be transmitted to the server device. Note that, for a technique of creating an XML file from a barcode or QR code attached to a product, a technique described in a reference document "Fukuroi e-Net EPCIS/Master Data/Related Subsystem Interface Specifications" by Fukuroi e-Net Promotion Committee may be used. A product ID such as a bar code and a QR code attached to a product read by the input unit 204 includes information such as a manufacturer ID, a product name, and a manufacturing number.

The data sent from the client device 200 to the server device 100 includes a file name that is data identification information that identifies data and an XML file. The XML file includes, as information read and generated by the input unit 204, information such as a manufacturer ID, a product name, and a manufacturing number, which is stakeholder identification information that identifies a stakeholder operating a client device.

Further, one or a plurality of the client devices 200 correspond to one of the server device 100. Although the number of client devices is optional, an example in which a first client device 200-1, a second client device 200-2, a third client device 200-3, and a fourth client device 200-4 are connected to the server device 100 will be described hereinafter.

The blockchain 300 is composed of a plurality of servers and personal computers (nodes) that do not have a specific administrator. Functionally, ordered records called blocks store a continuously increasing list. Each block contains a time stamp and a link to a previous block. As is publicly known as a concept of a blockchain, each block can guarantee non-tampering by tracing back a chain of the block.

The hash processing unit 104 of the server device 100 generates a hash value for data transmitted from the client device 200, and transfers the hash value to the blockchain 300 via the network 900. Since the hash value is changed when the data of the server device 100 is tampered with, whether or not tampering is performed can be proved as the hash value is compared with the hash value of the blockchain 300.

FIG. 2 functionally represents the blockchain 300, and shows a control unit 301, a communication unit 302 that performs communication via the network 900, and a hash storage unit 303 that is a storage device that stores hash information. Since a blockchain itself has a publicly-known structure, detailed description of the blockchain will be omitted.

In the server device 100, the client device 200, and the blockchain 300, the control units 101, 201, and 301 control the entire device including an input and output device, and predetermined processing is executed using a dedicated program. Further, the communication units 102, 202 and 302 perform communication via the network 900. The display unit 203 of the client device 200 displays content of object data to the user. The hash storage unit 303 of the blockchain 300 records a hash value sent from the server device 100 as a blockchain.

The above information processing device may be composed of a single computer, or an optional part of the input device, the output device, the processing device, and the storage device may be composed of another computer connected by a network. Further, in the present embodiment, a function equivalent to a function configured by software can also be realized by hardware such as a field programmable gate array (FPGA) and an application specific integrated circuit (ASIC).

Figure 3:
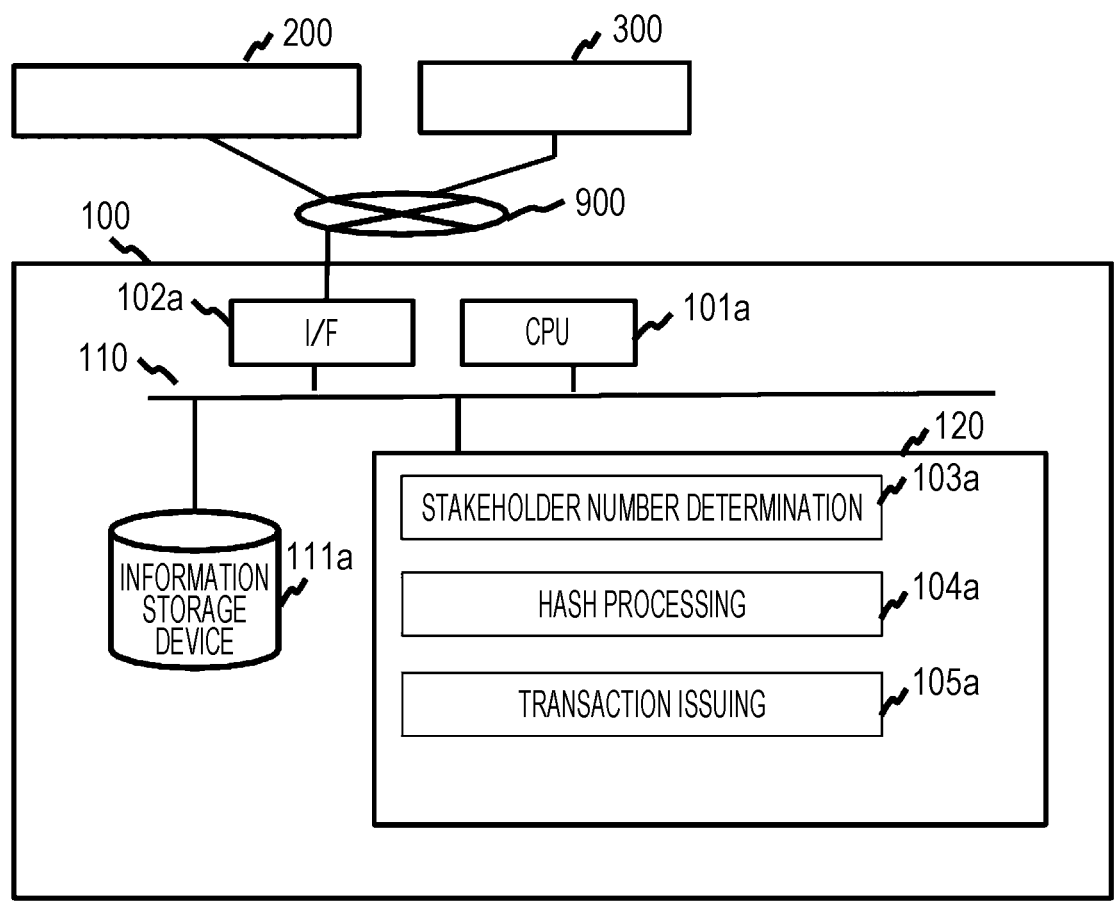
FIG. 3 is a hardware block diagram of a server device according to the embodiment.

FIG. 3 shows a hardware block diagram of the server device 100.

The server device 100 includes an interface 102a constituting the communication unit 102, a CPU 101a constituting a control unit, a storage device 111a constituting an information storage unit, and a memory 120 storing various programs and data. Furthermore, the server device 100 has a bus 110 that connects the interface 102a, the CPU 101a, the storage device 111a, the memory 120, and the like to each other.

The memory 120 stores various programs such as a stakeholder number determination program 103a, a hash processing program 104a, and a transaction issuing program 105a. The CPU 101a executes the various programs stored in the memory 120 so as to realize various functions of the stakeholder number determination unit 103, the hash processing unit 104, and the transaction issuing unit 105.

(Example of Logistics Event)

Figure 4:
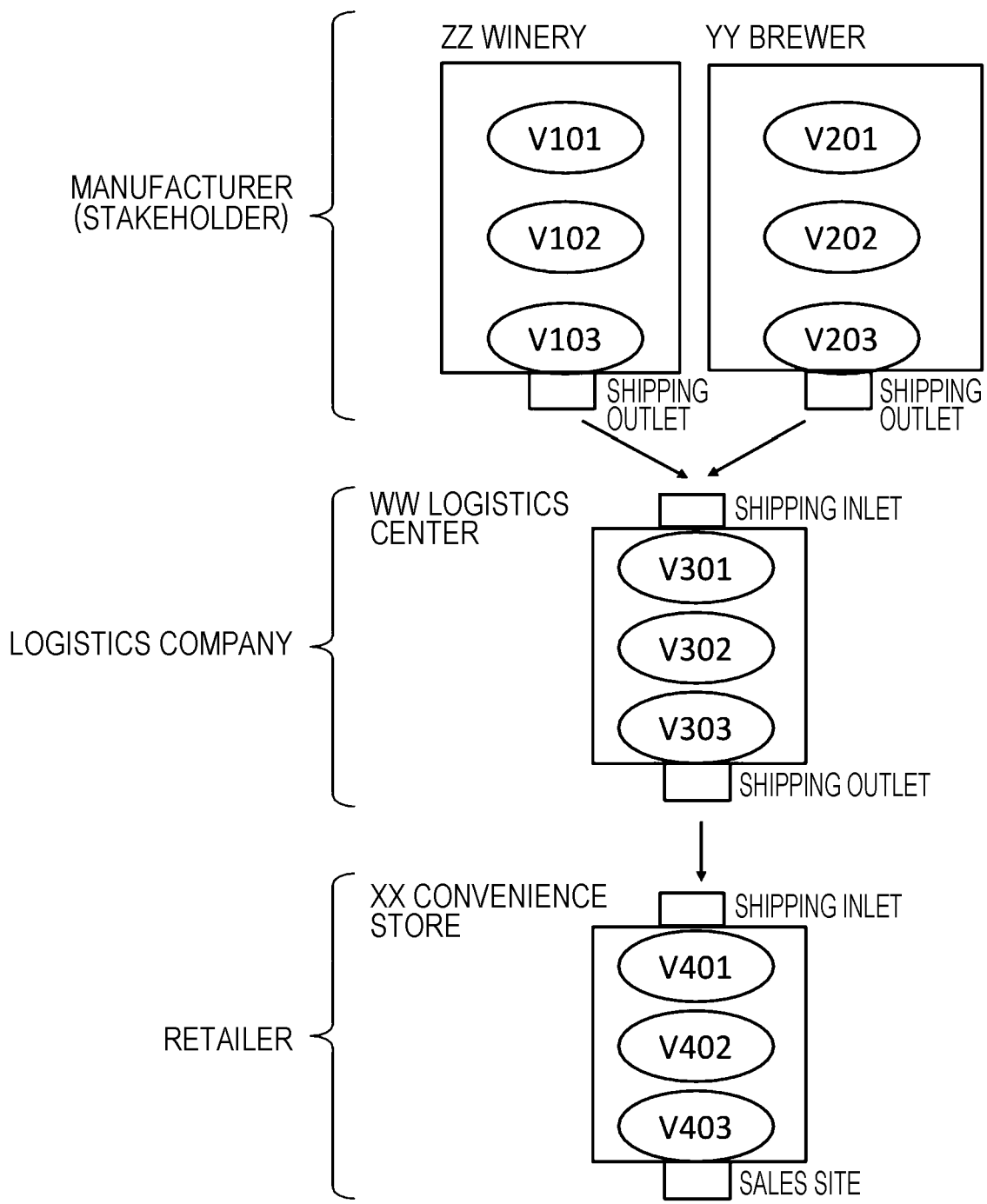
FIG. 4 is a schematic diagram of an event that occurs at each location.

FIG. 4 is a schematic diagram of an event that occurs at each location. In the first embodiment, there are four client devices, which are operated by each user who is a stakeholder. Assume that, of the four client devices, two are used by a manufacturer, two are used by a logistics company, and one is used by a retailer. Data is sent to the server device 100 each time an event occurs in a process of distributing a product in the order of the manufacturer, the logistics company, and the retailer. V101 and V102 are events in which a first manufacturer assembles a product or packs a product in a box or the like. V103 is an event of shipping a product from the first manufacturer. Similarly, V201 to V203 are events that occur in a second manufacturer. V301 is an event in which a product arrives at a logistics company. V302 is an event of packing a product in a box or the like in the logistics company. V301 is an event in which a product is shipped from the logistics company. V401 is an event in which a product reaches a retailer. V402 is an event in which a product is unpacked in the retailer. V403 is an event in which the retailer sells a product to a customer.

Hereinafter, data transmitted from the client device 200 to the server device 100 will be described based on an XML file generated by reading a barcode or a QR code attached to a product. However, the present invention is not limited to this.

Figure 5:
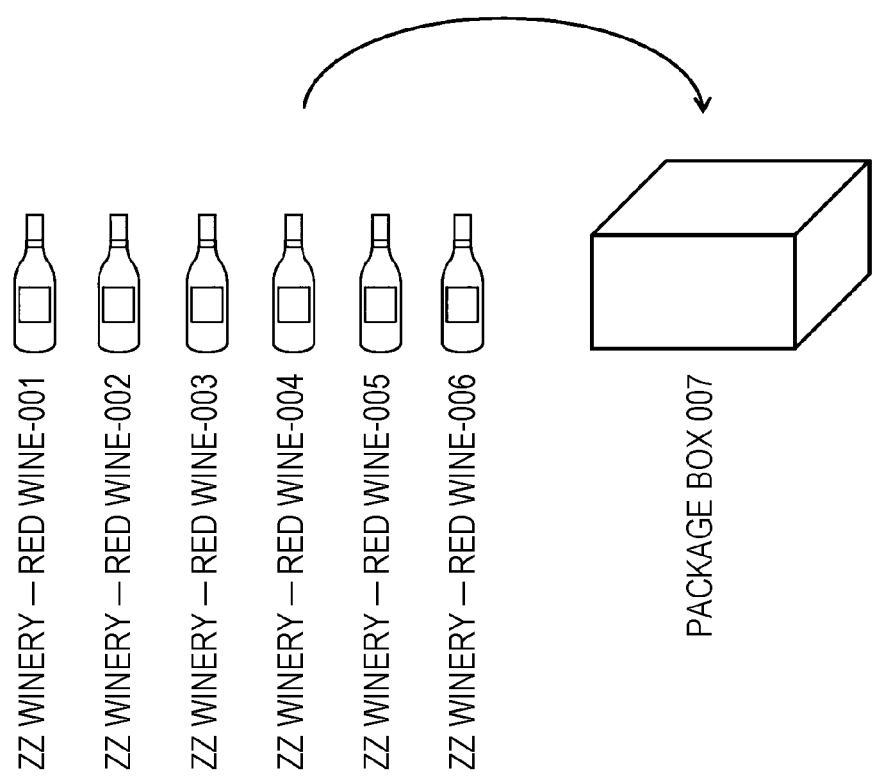
FIG. 5 is a schematic diagram of a packing event.

FIG. 5 is a schematic diagram of a packing event occurring in a logistics company. In this example, six products are assumed to be packed in one box. A product and a box are assigned a uniquely identifiable ID (product ID). The product ID has a format such as a bar code or a QR code, and includes information such as a manufacturer ID, a product name, and a manufacturing number.

FIG. 6 shows an example of an XML file 601 of a packing event in a case where the number of stakeholders is one. The XML file 601 is generated as the input unit 204 reads a product ID such as a barcode or a QR code attached to a product or a package. For the creation of an XML file, a technique described in the above reference can be used. The XML file 601 stores a manufacturer ID, a product name, and a manufacturing number included in a product ID as an epc.

Although FIG. 6 shows an extensible markup language (XML) format, a JavaScript (registered trademark) object notation (JSON) format may be used. In the item of epcList, an ID for identifying a box is described as parentID, and an ID for identifying a product is described as childEPCs.

FIG. 7 shows an example of an XML file 701 as data of a packing event in a case where the number of stakeholders is two. The XML file 701 is generated when the input unit 204 of the client device 200 performs reading. In the example of FIG. 7, data regarding a product of two manufacturers are included as an epc.

FIG. 8 shows an XML file 801 which is verification data for the first stakeholder. The XML file 801 is verification data of the XML file 701 of FIG. 7, and is an example in a case where there are two stakeholders. Only information of the first stakeholder is described in a child element of childEPCs. The XML file 801 is created by the stakeholder number determination unit 103 of the server device 100. The stakeholder number determination unit 103 of the server device 100 reads an epc portion of the XML file 701 sent from the client device 200, and counts, for example, the number of manufacturers as the number of stakeholders, leaves only information of the first stakeholder unreplaced, and replaces information of the second stakeholder in the XML file with a character string from which the original information cannot be guessed.

FIG. 9 shows an XML file 901, which is verification data for the second stakeholder. The XML file 901 is verification data of the XML file 701 of FIG. 7, and is an example in a case where there are two stakeholders. Only information of the second stakeholder is described in a child element of childEPCs. The XML file 901 is created by the stakeholder number determination unit 103 of the server device 100. The stakeholder number determination unit 103 of the server device 100 reads an epc portion of the XML file 701 sent from the client device 200, and counts, for example, the number of manufacturers as the number of stakeholders, leaves only information of the second stakeholder unreplaced, and replaces information of the first stakeholder in the XML file with a character string from which the original information cannot be guessed.

As described above, the stakeholder number determination unit 103 of the server device 100 reads an epc of an XML file from the client device 200, leaves information of any one specific stakeholder unrewritten, and rewrites information of the other stakeholders with optional information to generate management data. In a case where information on stakeholders of n organizations is stored in one XML file, n types of management data are generated. The management data may be generated in the form of an XML file, and stakeholder identification information may be added to a file name of the generated XML file. Note that, instead of rewriting information of other stakeholders with optional information, the information on other stakeholders may be deleted.

FIG. 10 shows a data structure stored in the blockchain 300. The data structure includes a TxID 1001, a file name 1002, and a hash 1003. The TxID 1001 is an ID issued when a transaction is performed on a blockchain. That is, the ID is issued when the server device 100 transfers information to the blockchain 300. The file name 1002 is a file name of management data described in an XML format, and is identification information of management data generated by the server device 100 for each stakeholder. Note that this file name includes stakeholder identification information of a stakeholder for which information remains. The hash 1003 is a hash value generated by the hash processing unit 104 based on file data described in an XML format.

(Write in the First Embodiment)

Figure 11:
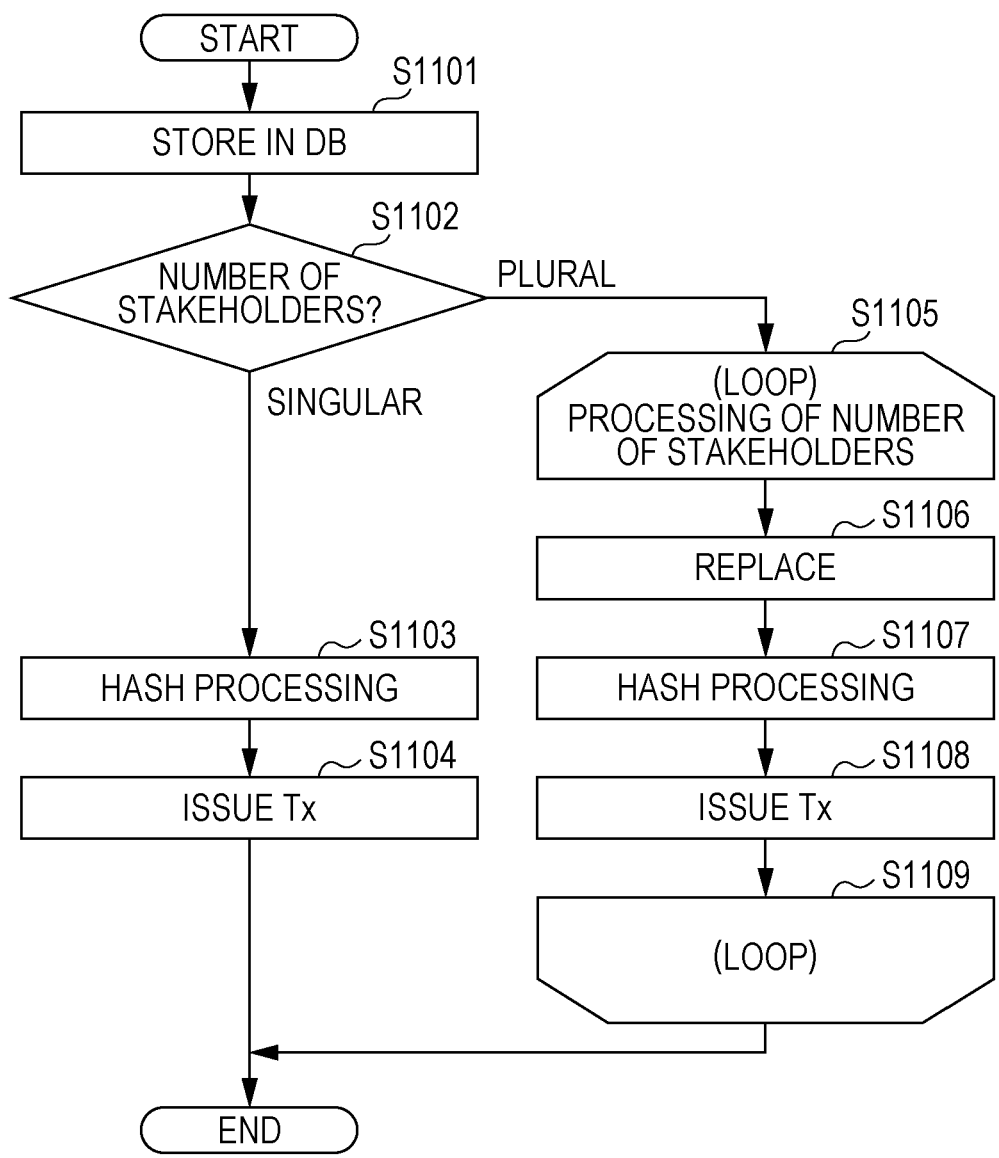
FIG. 11 is a diagram showing an example of a data write flowchart according to a first embodiment.

FIG. 11 is a write flowchart for performing data management of the first embodiment.

First, data is transmitted from the client device 200. The data includes data identification information (for example, a file name) that identifies data and an XML file. The XML file includes an ID of a company that operates a client device. Data (XML file) that reaches the server device 100 is recorded in a DB of the information storage unit 111 (S1101). The data is stored in the DB of the information storage unit 111 together with data identification information (file name) that identifies data, stakeholder identification information (manufacturer of a product) that identifies a stakeholder that operates a client device, and an XML file.

Next, the stakeholder number determination unit 103 determines the number of stakeholders included in an XML file (S1102). In a case where the number of stakeholders is one, the hash processing unit 104 performs hash processing on the XML file that reaches the server device 100 (S1103), and issues Tx (S1104). The server device 100 issues Tx to the blockchain 300, and the issued Tx includes a TxID, which is identification information for identifying Tx, a file name, and a hash value. The blockchain 300 manages data in a data structure shown in FIG. 10.

In a case where the number of stakeholders is plural, the processing is performed for the number n of stakeholders (S1105). In an n-th loop, information of stakeholders other than an n-th stakeholder is replaced to generate management data (S1106). That is, in a case where the number of stakeholders is n, n types of management data are generated. The hash processing unit 104 performs hash processing on the replaced management data (S1107), and issues Tx (S1108). In a case where the number of stakeholders is n, n types of management data are generated and Tx is issued n times. The server device 100 issues Tx to the blockchain 300, and the issued Tx includes an ID of Tx and a file name, as well as a hash value generated by hash processing. In this manner, a verifier cannot browse information of other companies, and both tamper resistance and data sovereignty can be guaranteed.

(Verification)

Figure 12:
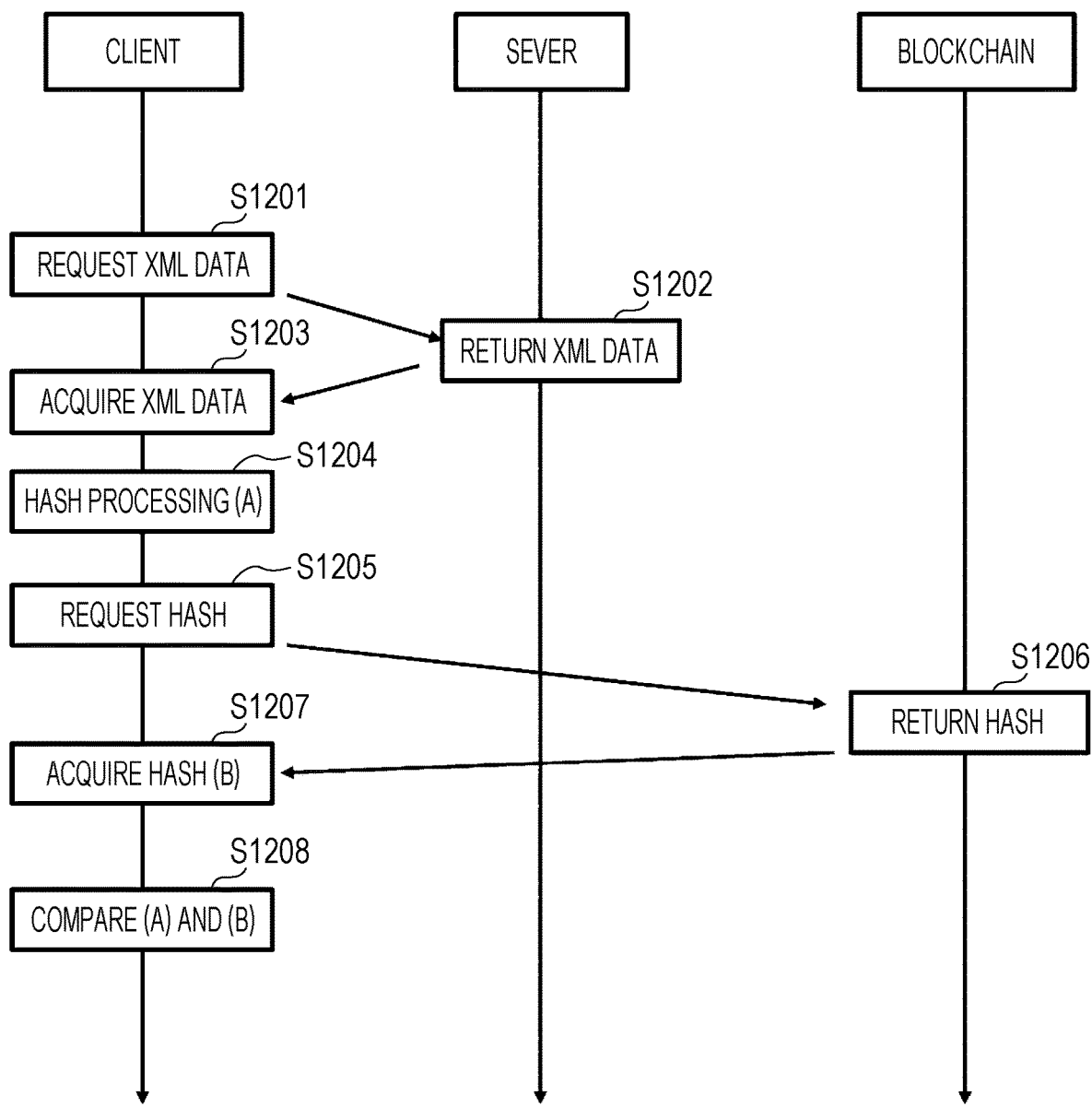
FIG. 12 is a diagram showing an example of a data verification flowchart according to the first embodiment.

FIG. 12 is a verification flowchart of the first embodiment. A client performing verification is assumed to be a manufacturer.

First, the client device 200 requests XML data from the server device 100 by designating an XML file name that is identification information of data and stakeholder identification information (manufacturer of a product) that identifies a stakeholder (S1201).

The server device 100 reads an XML file from the designated file name and stakeholder information from a DB, and returns XML data (management data) in which information other than that of a client as a request source is replaced (S1202). The client device 200 acquires the requested XML file (management data) (S1203). The client device performs hash processing on the acquired XML file (management data) to generate a hash value of the acquired XML file (management data) (S1204).

Next, the client device designates stakeholder identification information for identifying a manufacturer of a product and a file name to request a hash value of the data from the blockchain 300 (S1205). The blockchain 300 refers to the data structure shown in FIG. 10 to return a hash value corresponding to the designated file name and stakeholder identification information (S1206). Note that, as described above, the file name of the data structure shown in FIG. 10 includes information for identifying a stakeholder. In this manner, the client device acquires a hash value (S1207).

Finally, the hash value generated in Step S1204 is compared with the hash value acquired in Step S1207 to verify the data (S1208). If the hash values match with each other, data stored in the server device 100 is guaranteed not to be tampered with. Information on other stakeholders is rewritten by the stakeholder number determination unit 103 into optional information, and a verifier cannot browse information of other companies, so that both tamper resistance and data sovereignty can be guaranteed.

Second Embodiment

Figure 13:
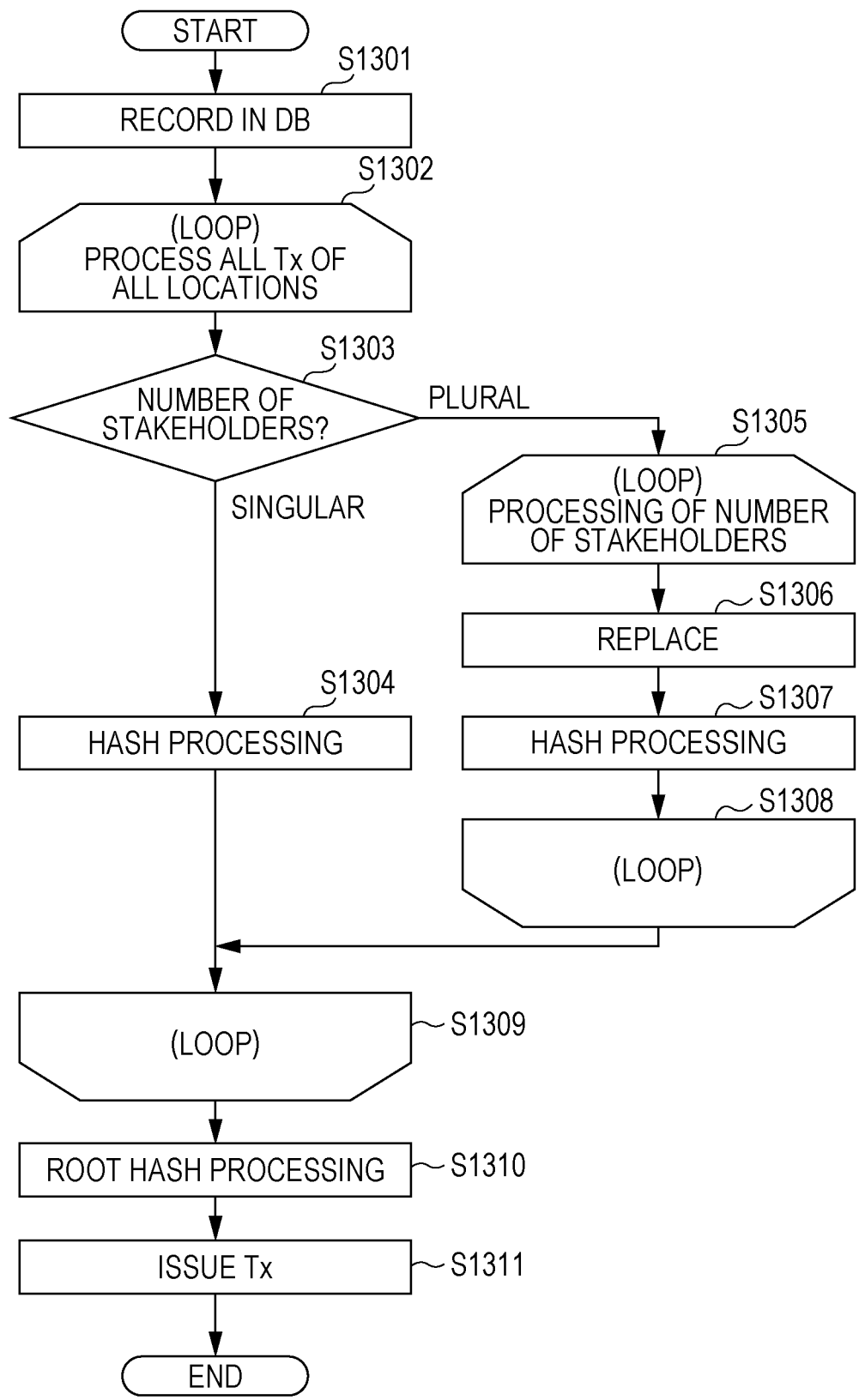
FIG. 13 is a diagram showing an example of a data write flowchart according to a second embodiment.

FIG. 13 is a write flowchart for performing data management of a second embodiment.

Hereinafter, only a difference from the first embodiment will be shown. In the second embodiment, Tx is not issued every time the number of stakeholders is determined, but Tx is issued collectively. That is, after the loop of S1302 to S1309 is finished, root hash processing is performed (S1310) and Tx is issued (S1311). For example, the root hash processing (S1310) can be collectively performed for each piece of data from each of a plurality of the client devices 200. Description will be made based on an assumption below. V101, V102, and V103 shown in FIG. 4 are composed of product information of the first stakeholder or information other than that of a product, and do not include product information of the second stakeholder. Further, V201, V202, and V203 are composed of product information of the second stakeholder or information other than that of a product, and do not include product information of the first stakeholder. Further, V301, V303, V401, V402, and V403 are composed of information other than that of a product, and do not include product information of the first and second stakeholder. Further, V302 is composed of product information of the first and second stakeholders and information other than that of a product. For convenience, a hash of an XML file of V101 is indicated as H(V101), and hashes of other XML files are also expressed according to a similar rule. Further, in an XML file of V302, a hash of first stakeholder verification data 801 is expressed as H(V302-1), and a hash of second stakeholder verification data 901 is expressed as H(V302-2). In such cases, for verification of the first stakeholder, H(V101), H(V102), H(V103), H(V301), H(V302-1), H(V303), H(V401), H(V402), and H(V403) are collectively subjected to root hash processing. Similarly, for verification of the second stakeholder, H(V201), H(V202), H(V203), H(V301), H(V302-2), H(V303), H(V401), H(V402), and H(V403) are collectively subjected to root hash processing. In addition to the advantage shown in the first embodiment, the second embodiment has an advantage that the number of times of issuing Tx is reduced.

Third Embodiment

Figure 14:
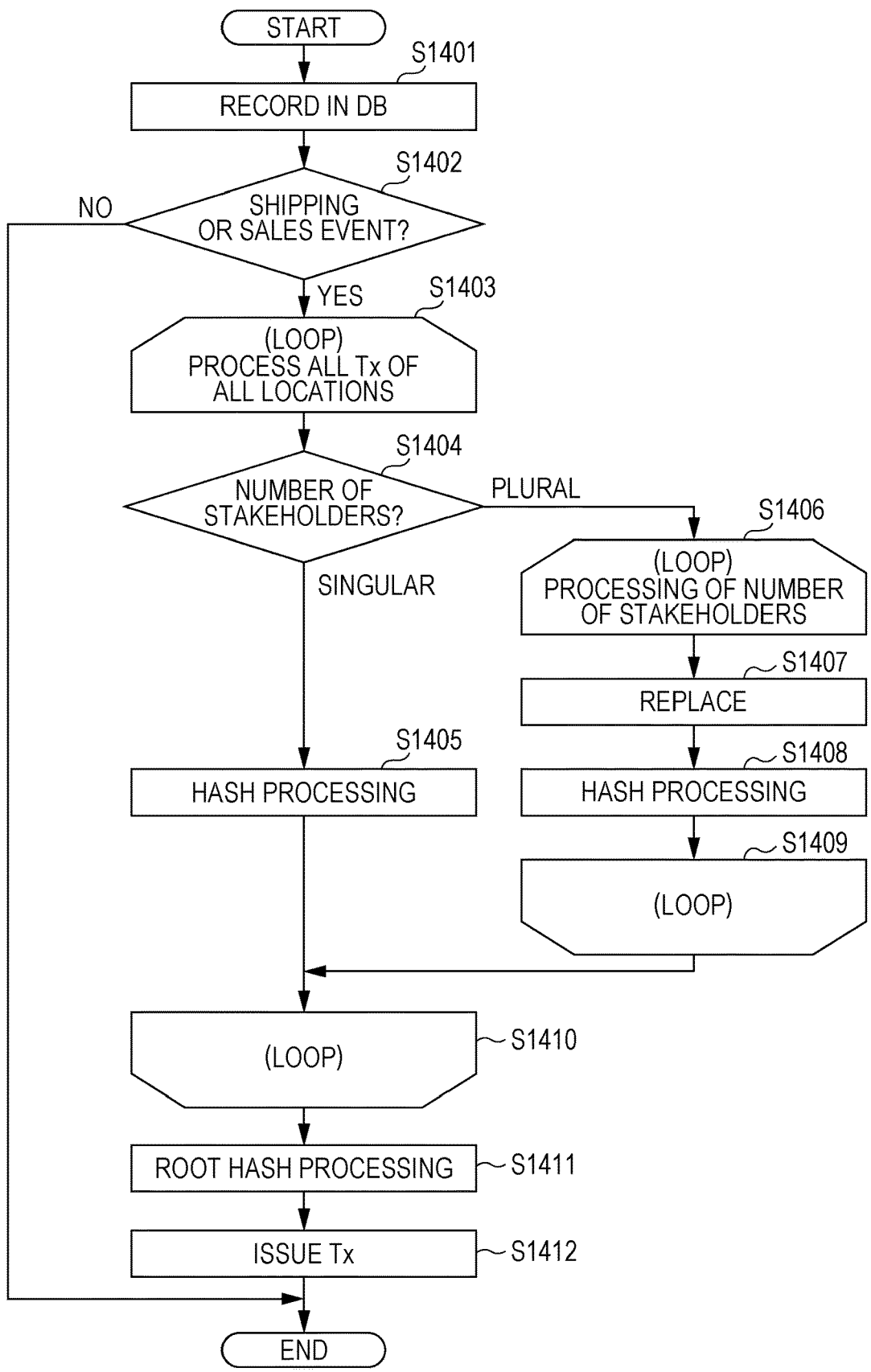
FIG. 14 is a diagram showing an example of a data write flowchart according to a third embodiment.

FIG. 14 is a write flowchart for performing data management of a third embodiment.

Hereinafter, only a difference from the second embodiment will be shown. In the third embodiment, after recording in a DB (S1401), whether a type of event is a shipping or sales event is determined (S1402). The type of event is determined by the server device based on content of an XML file. In a case where the type of event is not a shipping or sales event, the processing is terminated. In a case of a shipping or sales event, all Tx of a location are processed in a loop of S1403 to S1410 and a root hash is processed (S1411), and Tx is issued (S1412). Description will be made below based on an assumption similar to that of the second embodiment. In such a case, for verification of the first stakeholder, root hash processing is performed collectively for H(V101), H(V102), and H(V103) at a timing at which a shipping event of a manufacturer ends, root hash processing is performed collectively for H(V301), H(V302-1), and H(V303) at a timing at which a sales event of a logistics company ends, and root hash processing is performed collectively for H(V401), H(V402), and H(V403) at a timing at which a sales event of a retailer ends. Similarly, for verification of the second stakeholder, root hash processing is performed collectively for H(V201), H(V202), and H(V203) at a timing at which a shipping event of a manufacturer ends, root hash processing is performed collectively for H(V301), H(V302-2), and H(V303) at a timing at which a sales event of a logistics company ends, and root hash processing is performed collectively for H(V401), H(V402), and H(V403) at a timing at which a sales event of a retailer ends. In addition to the advantage shown in the second embodiment, in the third embodiment, there is an advantage that Tx can be issued at a timing at which a product moves between locations, and the number of Tx can be reduced while immediacy is maintained.

Fourth Embodiment

FIG. 15 is a diagram showing an example in which the processing of the server device described in the first to third embodiments is applied to a traceability method of a product.

In the fourth embodiment, two food makers produce wine and sake, and deliver them to a food maker warehouse via a delivery company (first delivery). The food maker warehouses are located in Kanto and Kansai areas. A delivery company (second delivery) delivers a product to each warehouse of a plurality of convenience stores (first convenience store, second convenience store). A delivery company (third delivery) delivers a product to each store of the first convenience store and the second convenience store.

By performing the data management described in each embodiment in such a distribution route, a manufacturer of wine can guarantee tamper resistance of information on wine. In a case where recall measures need to be taken for produced wine, in which store of which convenience store wine to be recalled exists can be identified. Further, data of information on events such as packing of product can be managed while tamper resistance is guaranteed in a manufacturer, a delivery companies (first delivery), a food maker warehouse, a delivery company (second delivery), a convenience store warehouse, a delivery company (third delivery), and a convenience store. Accordingly, a cause of recall can be investigated at the time of recall. For example, in a case where a defective product is found in Totsuka store of the first convenience store and Osaka store of the first convenience store, an upstream side of the first delivery is found to be common, and the upstream side of the first delivery can be presumed to be a location of the cause. Further, in a case where a defective product is found only in a specific convenience store, a downstream side of the first delivery is presumed to be a location of the cause.

What is claimed is:

1. A management system, comprising:
a server;
a plurality of client devices, which each include a processor and a memory, the client devices each connected to the server via a network; and
a plurality of nodes implementing a blockchain, the plurality of nodes connected to the plurality of client devices and the server via the network,
wherein a first client device of a first stakeholder of a plurality of stakeholders, is configured to:
obtain information from a first code of a first product of a first stakeholder,
obtain information from a second code of a second product of a second stakeholder,
generate data based on the obtained information,
generate a file name;
generate an extensible markup language (XML) file containing identification (ID) information of the first stakeholder and ID information of the second stakeholder, and
transmit to the server the XML file, the file name and the data,
wherein the server includes a storage device that stores the file name in association with the XML file and the data,
wherein the server is configured to:
delete ID information of the second stakeholder from the stored XML file and leave the ID information of the first stakeholder unchanged to generate first management data,
generate a first hash value for the first management data,
delete ID information of the first stakeholder from the stored XML file and leave the ID information of the second stakeholder unchanged to generate second management data,
generate a second hash value for the second management data,
transmit the generated first hash value and the second hash value to at least one node implementing the blockchain,
receive a browsing request specifying the file name and one of the first stakeholder identification information and the second stakeholder ID information from the client device, and
return to the client device one of first management data and second management data corresponding to the received one of the first stakeholder identification information and the second stakeholder ID information.

2. The server device according to claim 1, wherein the server is configured to generate a third hash value that is a combination of the first management data and the second management data.

3. The server device according to claim 1, wherein the client device includes a plurality of client devices corresponding to the plurality of stakeholders.

4. A traceability method by a system having a plurality of client devices, a server device, and plurality of nodes implementing a blockchain, comprising:
obtaining, by a first client device of a first stakeholder of a plurality of stakeholders, information from a first code of a first product of a first stakeholder;
obtaining, by the first client device, information from a second code of a second product of a second stakeholder;
generating, by the first client device, data based on the obtained information;
generating, by the first client device, a file name; and
generating, by the first client device, an extensible markup language (XML) file containing identification (ID) information of the first stakeholder and ID info of the second stakeholder;
transmitting, by the first client device, to the server the XML file, the file name and the data;
storing, by the server device, the file name in association with the XML file and the data;
deleting, by the server device, ID information of the second stakeholder from the stored XML file and leaving the ID information of the first stakeholder unchanged to generate first management data;
generating, by the server device, a first hash value for the first management data;
deleting, by the server device, ID information of the first stakeholder from the stored XML file and leaving the ID information of the second stakeholder unchanged to generate second management data;
generating, by the server device, a second hash value for the second management data;
transmitting, by the server device, the generated first hash value and the second hash value to at least one node implementing the blockchain;
receiving, by the server device, a browsing request specifying the file name and one of the first stakeholder identification information and the second stakeholder ID information from the client device; and
returning, by the server device and to the client device, one of first management data and second management data corresponding to the received one of the first stakeholder identification information and the second stakeholder ID information.

5. The traceability method according to claim 4, wherein generating a hash value which is a collection of the first hash value and the second hash value.

6. The traceability method according to claim 4, wherein each of
the plurality of client devices is operated by a different user.

* * * * *